(12) United States Patent
Zimmerman et al.

(10) Patent No.: US 9,127,893 B2
(45) Date of Patent: Sep. 8, 2015

(54) DEVICE FOR INFLUENCING THE FLOW IN THE REGION OF A TUBE SUPPORT PLATE OF A TUBE BUNDLE HEAT EXCHANGER

(75) Inventors: Dietrich Zimmerman, Heek-Nienborg (DE); Brigitte Schlag, Coesfeld (DE); Marcus Guenther, Moelln (DE); Norbert Busch, Borken (DE)

(73) Assignee: GEA TDS GmbH, Sarstedt (DE)

( * ) Notice: Subject to any disclaimer, the term of this patent is extended or adjusted under 35 U.S.C. 154(b) by 1243 days.

(21) Appl. No.: 12/097,181

(22) PCT Filed: Nov. 28, 2006

(86) PCT No.: PCT/EP2006/011373
§ 371 (c)(1),
(2), (4) Date: Sep. 3, 2008

(87) PCT Pub. No.: WO2007/068343
PCT Pub. Date: Jun. 21, 2007

(65) Prior Publication Data
US 2009/0205813 A1    Aug. 20, 2009

(30) Foreign Application Priority Data
Dec. 13, 2005  (DE) .......................... 10 2005 059 463

(51) Int. Cl.
*F28F 9/02*   (2006.01)
*F28D 7/00*   (2006.01)
(Continued)

(52) U.S. Cl.
CPC ... *F28D 7/16* (2013.01); *A23L 3/22* (2013.01); *F28F 9/0265* (2013.01); *F28F 9/26* (2013.01); *F28F 2009/029* (2013.01); *F28F 2250/02* (2013.01)

(58) Field of Classification Search
CPC .. F28D 7/16; F28F 2009/029; F28F 2250/02; F28F 9/0265; F28F 9/26
USPC ......................................... 165/159, 174, 158
See application file for complete search history.

(56) References Cited

U.S. PATENT DOCUMENTS 2,772,076 A    11/1956   Matthews
5,266,343 A *  11/1993   Stauffer ....................... 426/522
(Continued)

FOREIGN PATENT DOCUMENTS

DE    94 03 913.5       6/1994
DE    103 11 529 B3     9/2004
(Continued)

OTHER PUBLICATIONS

Pandora Jewelry vs. Cappolla Capital Corp.*
(Continued)

*Primary Examiner* — M. Alexandra Elve
*Assistant Examiner* — Henry Crenshaw
(74) *Attorney, Agent, or Firm* — Vidas, Arrett & Steinkraus, P.A.

(57) ABSTRACT

The present invention is related to a device for influencing the flow in the region of a tube support plate (700, 800) of a tube bundle heat exchanger (100), for the food and beverage industry in particular. A displacement body (10, 11) is provided with a shank part (10c, 11c) which extends in the direction of its axis of symmetry (S) and which, at its end distal to the displacement body (10, 11) is fixedly connected to a connection bend (1000) or connection fitting (1100; 1200) which follows the exchanger flange (500; 1100e) or the connecting piece (800d).

26 Claims, 6 Drawing Sheets

(51) Int. Cl.
*F28D 7/16* (2006.01)
*A23L 3/22* (2006.01)
*F28F 9/26* (2006.01)

(56) References Cited

U.S. PATENT DOCUMENTS

| | | | |
|---|---|---|---|
| 5,857,516 A * | 1/1999 | Jordison et al. | 165/159 |
| 6,250,379 B1 * | 6/2001 | Geissler et al. | 165/158 |
| 6,845,813 B1 | 1/2005 | Knight et al. | |
| 2003/0209344 A1 * | 11/2003 | Fang et al. | 165/140 |
| 2005/0051318 A1 * | 3/2005 | Fujita et al. | 165/178 |
| 2005/0082666 A1 * | 4/2005 | Lee et al. | 257/728 |
| 2005/0211425 A1 * | 9/2005 | McKittrick et al. | 165/174 |
| 2009/0205813 A1 * | 8/2009 | Zimmerman et al. | 165/174 |

FOREIGN PATENT DOCUMENTS

| | | | |
|---|---|---|---|
| EP | 0 356 648 A1 | 6/1989 | |
| EP | 0 377 089 A1 | 10/1989 | |
| EP | 0 357 907 A1 | 11/1989 | |
| EP | 357907 A1 * | 3/1990 | F22B 1/18 |
| WO | 2004051174 A1 | 6/2004 | |
| WO | 2004083761 A1 | 9/2004 | |
| WO | WO 2004083761 A1 * | 9/2004 | F28D 7/16 |

OTHER PUBLICATIONS

"Röhrenwärmetauscher VARITUBE®" from GEA Tuchenhagen, Liquid Processing Division, 632d-00, 2000.

* cited by examiner

DEVICE FOR INFLUENCING THE FLOW IN THE REGION OF A TUBE SUPPORT PLATE OF A TUBE BUNDLE HEAT EXCHANGER

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a device for influencing the flow in the region of a tube support plate of a tube bundle heat exchanger, for the food and beverage industry in particular, with an outer channel for a heat carrier medium surrounded by an outer shell, with a number of inner tubes which extend axis parallel to the outer shell through the outer channel, forming combinedly an inner channel and being supported in the tube support plate at their respective end sides, with an inlet or outlet common to all the inner tubes, formed in an exchanger flange; and with a common outlet or inlet for a product formed in a connecting piece, and with at least one displacement body influencing the flow in the region of the tube support plate, which is fixedly fastened and which is arranged axially symmetric and concentric to the tube support plate, formed by two portions which form a greatest common exterior diameter at their connecting cross section, with the displacement body, which axially symmetrically divides the flow to or from the inner channel, deflects it towards the outside and by doing so accelerates it in an annular gap cross section which is nozzle-like constricted between the displacement body and an inner contour of the exchanger flange and the connecting piece, respectively, and which subsequently forms an enlarging annular gap cross section together with the inner contour.

A device of this generic kind is known from DE 103 11 529 B3, the entire contents of which is incorporated herein by reference, or from WO 2004/083761 A1, the entire contents of which is incorporated herein by reference. The tube bundle heat exchanger to be considered is described in DE-U-94 03 913, the entire contents of which is incorporated herein by reference. A more recent state of the art relating to this, which is, however, in principle not different from the ancient state of the art, is described in the manufacturer's pamphlet "Röhrenwärmetauscher VARITUBE®" from GEA Tuchenhagen, Liquid Processing Division, 632d-00, of the year 2000, the entire contents of which is incorporated herein by reference.

Because of their cross section geometry, such tube bundle heat exchangers are generally better suited than other constructions of heat exchangers, like plate heat exchangers for instance, for the thermal treatment of products with high and low viscosities, of solid-containing products with whole pieces, pulp or fibres. All the same, even in this it is observed that deposits are formed on the inlet openings of the inner tubes of the tube support plates with fibrous media, like juices with fruit pulp. The treatment at relatively high temperatures favours the agglomeration of fibres and the formation of pulp. These are preferably deposited on the bridges between the multiple parallel arranged inner tubes and on the flat areas of the tube support plate, which are disposed across to the flow direction, and can lead to clogging there. Temporary deposits are released at intervals and the lumps reach the package of the respective product which is designated for the consumer, where they are undesirable and have to be avoided in every case.

The problem described above is resolved in a very satisfying manner by an apparatus proposed in DE 103 11 529 B3, the entire contents of which is incorporated herein by reference, or WO 2004/083761 A1, the entire contents of which is incorporated herein by reference, but only when an active central tube in the centre of the tube support plate can be omitted or is omitted in tube bundle heat exchangers which are to be built new, in order to permit the displacement body to have a fixed, unmovable connection with the tube support plate at this central location. Geometrically optimal tube pitches with 7, 19, 37 and more tubes, which all contain an active central tube, are not possible in this case. Thus, an optimization of the hydraulic design of tube bundle heat exchangers resulting from these so-called tube area pitches must be renounced up to now when the displacement body is to be fixed in the centre of the tube support plate as envisioned in the anterior state of the art.

Furthermore, for back fitting the tube support plate of any tube area pitch what so ever (with or without active central tube) with a displacement body of the kind in discussion here, it is proposed in the anterior state of the art to realise the displacement body as a sphere which is positioned freely movable in front of the tube support plate. Such a sphere is subject to a certain wear, which has to be considered to be hygienically objectionable in sensitive fields of the food and beverage industry.

It is the objective of the present invention to develop further an apparatus of the generic kind, avoiding solutions which are problematic in the hygienic, cleanability and fluid dynamic aspects, such that deposits from solid-containing products in the critical region of the tube support plate are still prevented, without that the latter is subject to limitations in view of desirable tube area pitches, and that simple back fitting of existing tube bundle heat exchangers with a fluidically effective displacement body is possible in addition, without the disadvantages which are hitherto known.

BRIEF SUMMARY OF THE INVENTION

The fixed connection of the displacement body according to the present invention, via a shank part extending in the direction of its axis of symmetry, to a connection bend or connection fitting which follows the exchanger flange or the connecting piece results in an uncoupling of the function of the displacement body from the constructional design of the tube support plate, without that the reliable fluidic mechanisms described in DE 103 11 529 B3, the entire contents of which is incorporated herein by reference, or WO 2004/083761 A1, the entire contents of which is incorporated herein by reference, of the known displacement body are lost. Now, the geometrically optimal tube area pitches with 7, 19, 37 and more tubes, all containing an active central tube, can also be applied, which also permits an optimization of the hydraulic design of the tube bundle heat exchangers for all tube dimensions actually in use.

Through the constructional separation of the connection bend or the connection fitting in junction with its respective displacement body(s) on the one hand from the tube bundle(s) and the tube support plate thereof on the other hand, a very simple and very cost-saving back fitting of existing tube bundle heat exchangers of various manufacturers is also possible. This back fitting covers also existing connection bends, into which displacement bodies can be incorporated and fixed belatedly in a simple manner.

With the solution of the present invention, all the conceivable arrangements of the displacement body are possible. A first proposal envisions that the displacement body is arranged at the approach side of the tube support plate, so that the deposits contemplated here are effectively avoided.

According to a second proposal, the displacement body or the second displacement body is arranged at the downstream side of the tube support plate, through which a better cleaning effect in the flow-through cleaning (so-called CIP cleaning) is achieved due to the generated cross flow with respect to the tube support plate and together with a flow velocity which is locally increased at the tube support plate. This is always helpful, for instance when scorchings of milk in high temperature heating portions of tube bundle heat exchangers are to be removed by means of a CIP cleaning.

A further proposal envisions that the displacement body is arranged at the approach side and the displacement body or the second displacement body are arranged at the downstream side of the tube support plate. Through this, the two aforementioned advantageous effects can be combined at one tube bundle, so that deposits are avoided on the one side, and the cleanability is improved on the other side.

The aforementioned proposal becomes particularly simple and advantageous when the displacement bodies are arranged in one single connection bend or connection fitting which connects two neighbouring, substantially parallel arranged and series-connected tube bundles of the tube bundle heat exchanger with each other at a time.

The aimed at fluidic effect of the displacement body is due, among others, to the ring gap cross section between the latter and an inner contour of the exchanger flange or the connecting piece, respectively. The displacement body influences the flow surrounding it particularly effectively when this inner contour is formed by a first or a second, respectively, enlarged passage cross section within the exchanger flange or the connecting piece, respectively, as provided by a further proposal.

According to an advantageous embodiment, the desirable separation of the flow is achieved by a circumferential flow separation edge executed on the displacement body. This flow separation edge is particularly effective when it is positioned in the enlarged passage cross section of the exchanger flange or the connecting piece, respectively, as is also envisioned indeed.

The fluidic function of the proposed displacement body becomes particularly advantageous when the flow separation edge is positioned at a narrowest site (minimal ring gap cross section $A_{Smin}$) of the ring gap cross section ($A_S$), as is provided by a further advantageous embodiment.

A further embodiment related to this envisions to position the flow separation edge behind the narrowest site (minimal ring gap cross section $A_{Smin}$) of the ring gap cross section ($A_S$), when seen in the flow direction.

According to a further proposal of the invention, in order to secure sufficient efficiency of the proposed measures, an outside diameter of the displacement body is dimensioned such that a passage cross section of the inner tubes, which are situated on the outer edge of the tube support plate, and which is formed by a respective tube inside diameter, is covered each about half by a plane of flow, projected in the direction of the tube support plate, of the displacement body.

The demands which are requested from the displacement body according to the invention do not only consist of exerting a particularly efficient influence on the region of the approach of the tube support plate, but it has also to be executed such that it causes as little pressure drops as possible and does not itself become a problem concerning deposits. With regard to this, one advantageous embodiment provides that the portions of the displacement body are executed to be axially symmetric and that together, they form the flow separation edge at the connection cross section.

In this context, it is advantageous when the portions are delimited by a convex outer contour. For the attachment of the displacement body on the connection bend or on the connection fitting, it is envisioned that the shank part passes into the neighbouring portion in a continuous way, through which the flow resistances are kept low.

According to a further proposal, desirable separation and cross flow in the region of the tube support plate are favoured in that a periphery at the end side of the portion distal to shank forms a second circumferential flow separation edge.

It is known to connect the inner tubes of two neighbouring, substantially parallel arranged, series connected tube bundles of tube bundle heat exchangers with each other at a time, through which inner tubes the product flows, as known from the document DE 94 03 913 U1, the entire contents of which is incorporated herein by reference, for instance, via 180 degree tube bends (see also WO 2004/051 174 A1, the entire contents of which is incorporated herein by reference, or WO 2004/083 761 A1), the entire contents of which is incorporated herein by reference. In the depictions chosen there, the connection bends or connection fittings in consideration are each shown for one half only.

The present invention uses such a connection fitting and according to the present invention, the displacement body or the displacement bodies of the already described kind is/are fixed in the same. One proposal envisions that a first or second swirl chamber is assigned to each tube support plate in the context of the design of the connection fitting, and that the first and the second swirl chamber are connected with each other by an essentially linearly extending connection channel in a fashion which allows flow to pass through, which is oriented vertical to the longitudinal direction of the tube bundles.

In contrary to the paths taken up to now, the basic inventive principle of this embodiment is not to handle a product flow as flow accelerating as possible in the region of the 180 degree inversion, which flow passes through the respective inner tubes, which becomes a leaving product flow when it leaves the inner tubes on the tube support plate (outlet region) and which becomes an entering product flow before it enters the inner tubes in the region of the tube support plate (inlet region), but to create turbulences and swirls in this outlet and inlet region deliberately and methodically. In addition, these turbulences and swirls exert a cleaning effect on the respective tube support plate by turbulent cross exchange, and thus they support the function of the displacement body.

As is comprehensible, the approached tube support plate experiences much less deposits through the turbulences and swirls in the upstream entrance region than with arrangements of the state of the art. However, it may be noted in this place that in an unexpected manner, this cleaning effect is noticed on the downstream tube support plate also, where the generated turbulences and swirls exert the desired action quasi retroactively, seen in the flow direction.

In view of the concrete execution of the connection fitting, the present invention proposes an embodiment in which the first or second swirl chamber are each one realized to be pot-shaped, with a shell-shaped chamber casing an a substantially planar chamber bottom, wherein a chamber flange is arranged at the open end distal to the chamber bottom, sealable towards the tube support plate, wherein a chamber connecting piece is provided in the shell-shaped chamber casing, and wherein the respective chamber connecting piece is connected to a connection casing.

The above shortly delineated embodiment is not determined with respect to special cross section executions in view to circular, squariform or rectiform passage cross sections, but it gives hints to basic geometrical forms which are to be realized. In this it is fluidically advantageous when the respective chamber connecting piece is executed to be relatively short, as this is envisioned, and that in addition it is executed to be rounded at least on the inner side, which reduces the pressure losses.

According to a further proposal, the connection fitting of the present invention can be produced relatively simply from semi-finished parts by a positively bonded material connection, preferably through welding, when a circular tube is used for the chamber casing and for the connection casing, respectively, and the chamber connecting piece is executed as a collar, as has also been proposed.

Furthermore, the present invention proposes a connection fitting in a second embodiment, which is to be preferred when no measures to influence the flow are necessary on the downstream side. This embodiment is characterised in that a first swirl chamber is assigned to the approached tube support plate which is connected to the exchanger flange or the connecting piece via a connection channel, first extending essentially linear and vertical to the longitudinal direction of the tube bundles and subsequently via a 90 degree deflection bend, in a fashion which allows flow to pass through. This solution combines in itself the advantages of the combination of a swirl chamber with a displacement body arranged therein in the region of the approached tube support plate and of a connection channel extending in the transverse direction on the one hand with the per se known conditions of a tube bend in the region of the downstream side of the tube support plate on the other hand.

In this, the details of the lastly mentioned swirl chamber and the connection casing assigned thereto correspond to those of the above described embodiment in which two swirl chambers are connected with each other via the connection casing.

BRIEF DESCRIPTION OF THE SEVERAL VIEWS OF THE DRAWINGS

FIG. 5b shows the side view of the connection bend according to FIG. 5a.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated A tube bundle heat exchanger 100 of the state of the art, normally composed of a plurality of tube bundles 100.1 to 100.n (FIG. 1; see also DE-U-94 03 913), wherein an arbitrary tube bundle is designated with 100.1, consists in its central part of an outer shell 200, delimiting an outer channel 200*, with an outer shell flange 200a, arranged on the fixed bearing side at the left side with respect to the representation, and an outer shell flange 200b, arranged on the movable bearing side at the right side. The latter one is followed by a first crosswise channel 400a*, delimited by a first casing 400.1, with a first connecting piece 400a, and the outer shell flange 200a at the fixed bearing side is followed by a second crosswise channel 400b*, delimited by a second casing 400.2, with a second connecting piece 400b. A number of inner tubes 300, extending axis parallel to the outer shell 200 through the outer channel 200* and forming an inner channel 300* together, beginning with four and thereafter also increasing up to nineteen, if necessary even more in number, are each supported at their end sides in a tube support plate 700 at the fixed bearing side and a tube support plate 800 at the movable bearing side, respectively, (which are both also designated as tube area plates), and welded in it at their tube outer diameter, wherein this overall arrangement is introduced into the outer shell 200 via a not more designated opening on the second casing 400.2 and is clamped together with the second casing 400.2 via an exchanger flange 500 at the fixed bearing side, one flat sealing 900 at a time being interposed (fixed bearings 500, 700, 400.2).

Figure 1:
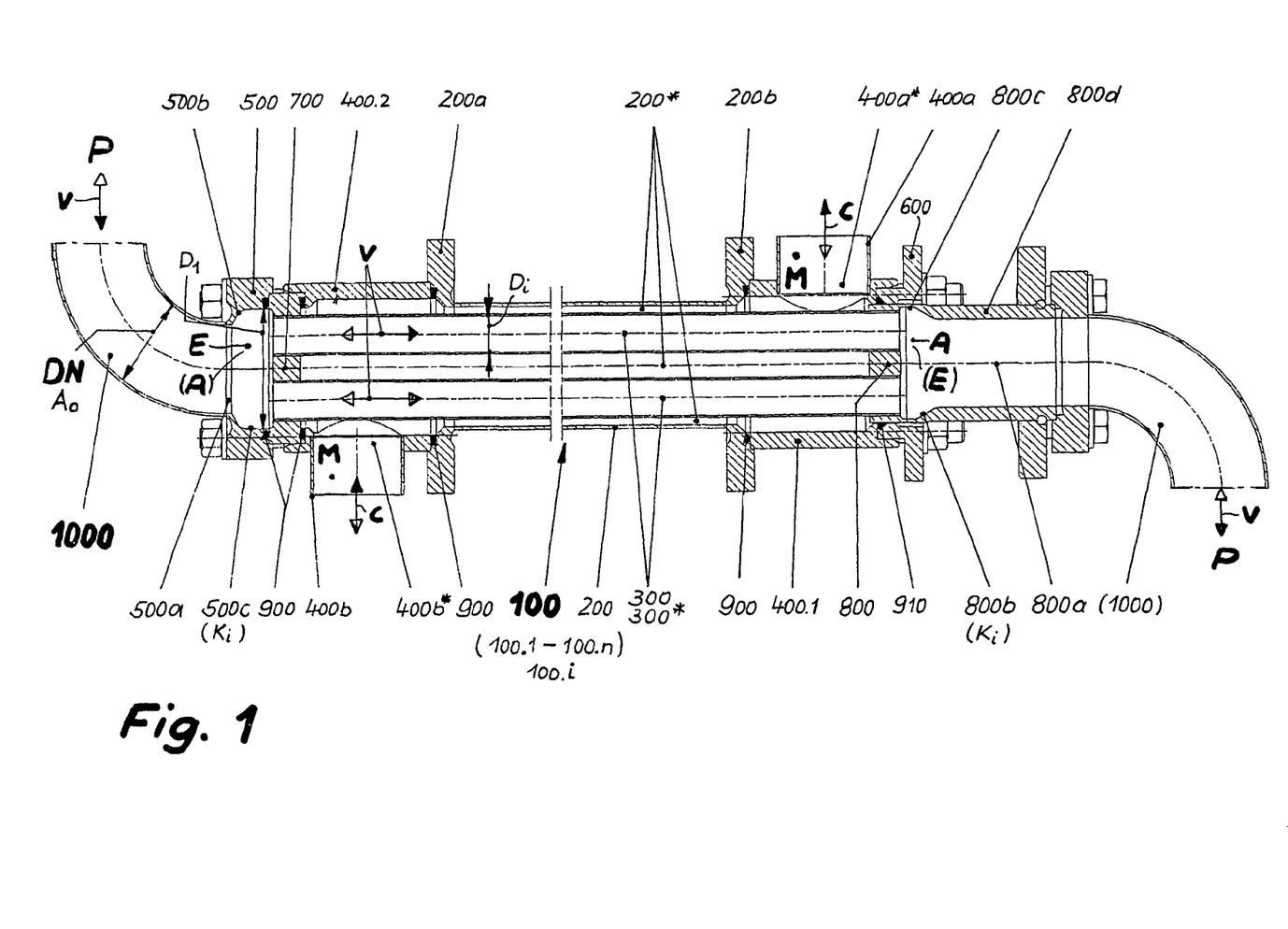
FIG. 1 shows a central section through a so-called tube bundle as a modular part of a tube bundle heat exchanger, consisting of a plurality of such tube bundles if necessary, wherein a circular connection bend is arranged on every side, to which the features of the invention do apply.

The two casings 400.1, 400.2 are also sealed against the respective neighbouring outer shell flange 200b, 200a with a flat seal 900, so that the first casing 400.1, arranged on the right side in connection with the outer shell 200, is pressed against the fixed bearings 500, 700, 400.2, arranged at the left side, via an exchanger flange 600 at the movable bearing side, an O-ring 910 being interposed in this. The tube support plate 800 at the movable bearing side punches through a not more designated bore into the exchanger flange 600 at the movable bearing side and finds its sealing with respect to the latter by the O-ring 910, which is subject to dynamic forces and which furthermore statically seals the first casing 400.1 against the exchanger flange 600 at the movable bearing side. The latter and the tube support plate 800 at the movable bearing side form a so-called movable bearing 600, 800, which permits the temperature-induced length changes of the inner tubes 300, welded into the tube support plate 800 at the movable bearing side, in both axial directions.

Depending on the arrangement of the respective tube bundle 100.1 to 100.n in the tube bundle heat exchanger 100 and its respective connection, the inner tubes 300 can be passed by a product P either from the left to the right or vice versa with respect to the representational position, the average flow velocity in the inner tube 300, and with this the inner channel 200*, being designated with v. The dimensioning with regard to cross section is done normally such that this average flow velocity v is also present in a connection bend 1000, which is connected on the one side with the exchanger flange 500 at the fixed bearing side and on the other side indirectly with a connecting piece 800*d* on the movable bearing side, which is itself fixedly connected with the tube support plate 800 on the movable bearing side. With the two connection bends 1000 (so-called 180 degree tube bends), each shown only for one half in the drawing, the contemplated tube bundle 100.*i* is connected in series with the respective neighbouring tube bundle 100.*i*−1 and with 100.*i*+1. For this reason, the exchanger flange 500 at the fixed bearing side forms an inlet E for the product P for one thing, and the connecting piece 800*d* at the movable bearing side accommodates an outlet A assigned thereto; at each neighbouring tube bundle 100.*i*−1 and 100.*i*+1, these relations of inlet and outlet are each correspondingly inverted.

The exchanger flange 500 at the fixed bearing side has a first connection opening 500*a*, which on the one hand corresponds to a rated diameter DN and with this to a rated passage cross section $A_O$ of the connection bend 1000 connected there, and which is on the other hand dimensioned such that the velocity of flow corresponding to the average velocity of flow v in the inner tube 300 or the inner channel 300*, respectively, is present there. A second connection opening 800*a* in the connecting piece 800*d* at the movable bearing side is also dimensioned in the same manner, the respective connection opening 500*a* and 800*a*, respectively, enlarging to a respective enlarged passage cross section 500*c* and 800*c*, respectively, in the region towards the neighbouring tube support plate 700 and 800, respectively, through a conical throat 500*b* and 800*b*, respectively. In this, the enlarged passage cross section 500*c* or 800*c*, respectively, is executed to be essentially cylindrical with a diameter $D_1$ (greatest diameter of the first enlarged passage cross section 500*c*) wherein the latter is normally one to two rated widths greater than the rated diameter DN of the connection bend 1000 (rated passage diameter $A_0$ of the connection bend), and thus it is dimensioned to be correspondingly greater than the overall passage cross section $nA_i$ of all the inner tubes 300 with a respective tube inner diameter $D_i$ and a passage cross section $A_i$ which enter into the exchanger flange 500 at the fixed bearing side. Together with the first conical throat 500*b* or 800*b*, the enlarged passage cross section 500*c* or 800*c* forms an inner contour Ki in the exchanger flange 500 at the fixed bearing side 500 or in the connecting piece 800*d* at the movable bearing side.

Depending on the direction of the velocity of flow v in the inner tube 300 or inner channel 300*, the product P to be treated flows towards the tube bundle 1001 to 100.*n*, either via the first connection opening 500*a* or the second connection opening 800*a*, so that either the tube support plate 700 at the fixed bearing side or the tube support plate 800 at the movable bearing side is approached. Because a heat exchange in the counter flow has to take place in the outer shell 200 or in the outer channels 200*, respectively, between product P in the inner tubes 300 or the inner channels 300*, respectively, and a heat carrier medium M in every case, this heat carrier medium M flows towards the first connecting piece 400*a* or even towards the second connecting piece 400*b* with a flow velocity c present in the outer shell 200.

A connection fitting 1100 (FIG. 2) of the present invention is constructed symmetrically with respect to an axis of symmetry S, which runs crosswise to a connection channel V, and it has a first and a second swirl chamber (T1, T2). The same are connected to each other so that flow can pass through, by the linearly extending connection channel V, wherein the latter is oriented vertical to the longitudinal axis of the not shown tube bundles 100.*i*, 100.*i*+1, which have an average distance b from each other and which are normally aligned with the associated axis of symmetry.

Figure 2:
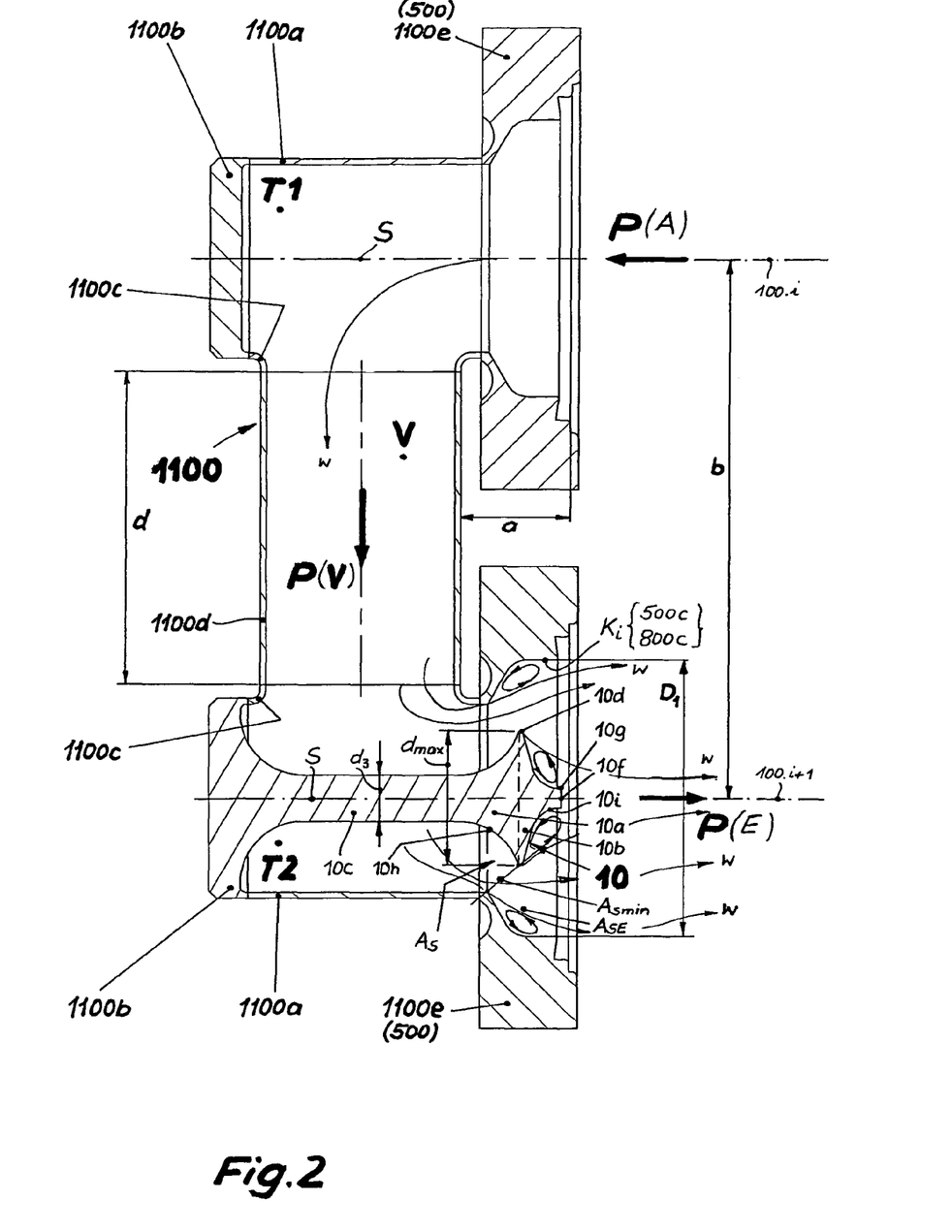
FIG. 2 shows a central section through the proposed connection fitting in a first embodiment, wherein a displacement body is arranged at the approach side of a not shown tube support plate inside a second swirl chamber.

In the present case, the connection fitting 1100 is flown through from a chamber flange 1100*e* shown in the upper part of FIG. 2 (for instance also exchanger flange 500 of the tube bundle 100.*i* at the fixed bearing side) towards a chamber flange 1100*e* also shown in the lower part of FIG. 2 (for instance also exchanger flange 500 of the tube bundle 100.*i*+1 at the fixed bearing side). A product flow P leaving the not shown tube support plate 700, 800 (see also FIG. 1 for this) flows into the first swirl chamber tube support plate 700, 800 and there it is deflected about 90 degree into the connection channel V in a nonsteady manner. By this nonsteady deflection, turbulences and swirls are generated in the first swirl chamber T1, which retroactively keep the downstream region of the not shown tube support plate 700, 800 free of deposits as far as possible. In the connection channel V, a crosswise flowing product flow P(V) (transverse flow) is created.

Now, the crosswise flowing product flow P(V) reaches the second swirl chamber T2 and here it is deflected about 90 degree in an unsteady manner a second time. This new unsteady deflection creates turbulences and swirls in the second swirl chamber T2 too, so that the product flow now generated in this respect, an entering product flow P(E), enters a not shown tube support plate 700, 800 (see also FIG. 1 for this) of the tube bundle 100.*i*+1, and here it generates the desired flow influencing effect, in addition to the fluidic effect of a displacement body 1 arranged in the second swirl chamber T2.

The first and the second swirl chamber T1, T2 are each one executed to be pot-shaped with a shell-shaped chamber casing 1100*a* and a substantially planar chamber bottom 1100*b*, wherein a circular tube is preferably used for the shell-shaped chamber casing 1100*a*.

At the open end distal to the chamber bottom 1100*b*, the chamber flange 1100*e* which is sealable with respect to the tube support plate 700, 800 is arranged, in which one not indicated sealing recess for the flat sealing 900 or an otherwise formed sealing is provided at a time. In each chamber casing 1100*a*, one chamber connection 110*c* at a time is provided in the form of a collar, wherein the two chamber connections 1100*c* are connected to a connection casing 1100*d*, preferably executed as a circular tube with a length d, which forms the edge of the connection channel V.

The surface line of the tube-shaped connection casing 1100*d* facing the two neighbouring tube support plates 700, 800 is made to be as near as constructionally possible to these two tube support plates 700, 800 (distance of the connection channel a). The inner diameter of the connection casing 1100*d* can be designed in a relatively flexible way, because no tube bend follows here and therefore no radius of curvature related to this has to be taken into account. The distance of the connection channel a is only determined by the axial dimensions of the chamber flanges 1100*e*, plus a small safety distance. The respective chamber flange 1000*e* is welded together without gap with the assigned chamber casing at the inner side. A not indicated relief groove, which is provided on the front face of the chamber flange 1100*e* distal to the sealing recess, facilitates all-round circular welding with the tube-shaped chamber casing 1100*a*.

Two neighbouring tube bundles 100.*i*, 100.*i*+1 can be placed side by side as near as this is constructionally possible (average distance of the tube support plates b). The connection fitting 100 is no limiting assembly part in this respect, because any axial distance between the two chamber connections 1100c can be bridged by the connection casing 1100d which is flexibly adaptable in its length d.

The connection fitting 100 of the present invention described above is arranged in the preferred region of the tube support plates 700 at the fixed bearing side, for instance. In principle, the fluidic principles on which the dimensioning of the connection fitting 1100 is based can also be translated for the region of the tube support plates 800 at the movable bearing side.

The displacement body 10 is executed as a whole to be rotationally symmetric to its longitudinal axis, the axis of symmetry S, and it consists of a preferably cylindrical shank part 10c, which has a shank diameter $d_3$, and a shank side portion 10a immediately following the latter, wherein the transition between these two is steady. The latter is connected to a portion 10b distal to the shank, and both portions 10a, 10b form a greatest common outside diameter $d_{max}$ at their connection cross section. The displacement body 10 is arranged in the second swirl chamber T2 such that its axis of symmetry S runs concentric to the longitudinal axis of the tube bundle 100.i+1, and thus concentric to the tube support plate 700, 800 (see also FIG. 1 for this). At its end distal to the displacement body 10, the shank part 10c is fixedly connected to the chamber bottom 1100b of the second swirl chamber T2. Thus, the arrangement described above realises a displacement body 10 arranged on the approach side of the tube support plate 700, 800.

The two portions 10a, 10b form a circumferential flow separation edge 10d at their connection cross section, which is positioned within the inner contour $K_1$ in the chamber flange 1100e or in the exchanger flange 500, respectively, and thus in the present case also in the enlarged passage cross section 500c or 800c, respectively, with the greatest diameter D1 (see also FIG. 1 for this). The first portion 10a has a first concave outer contour $10_h$ as the edge, and the second portion 10b has a second concave outer contour 10i as the edge. Together with the inner contour $K_i$, the first concave outer contour $10_h$ forms a nozzle-like tapering ring gap cross section $A_S$, which is on one side limited by the flow separation edge 10d at its narrowest position, a minimal ring gap cross section $A_{Smin}$. Together with the inner contour $K_i$, the second concave outer contour 10i forms an enlarging ring gap cross section $A_{SE}$. An end side periphery 10f of the portion 10b distal to the shank is formed in the form of a second circumferential flow separation edge 10g.

The product P(E) flowing to the inner channel 300* (see FIG. 1) of the tube bundle 100.i+1 via the second swirl chamber T2 with an unevenly distributed flow velocity w is subdivided in an axis-symmetric manner about the entire perimeter and deflected towards the outside by the displacement body 10. In this, the flow is accelerated in the ring gap cross section $A_S$ which is nozzle-like narrowed between the displacement body 10 and the inner contour $K_i$ of the chamber flange 1100e or the exchanger flange 500 at the fixed bearing side, and at the narrowest position thereof, the minimal ring gap cross section $A_{Smin}$, it reaches a maximal flow velocity. In the example of realisation, the flow separation edge 10d is positioned at the site of the minimal ring gap cross section $A_{Smin}$.

Behind the displacement body 10, the flow is deflected towards the centre of the tube support plate 700, 800, through which a passage of flow as even as possible takes place through all the inner tubes 300 or inner channels 300* (see FIG. 1 for this). In addition, the passage cross section for the flow enlarges behind the minimal ring gap cross section $A_{Smin}$. The flow which is curved and retarded in this way must inevitably separate in this region. By the flow separation edge 10d, the separation takes place methodically at this unique, unambiguously defined site. According to the laws of fluid mechanics, the delineated flow movement behind the displacement body 10 causes a secondary flow there, on which the desired action is partially based, namely the prevention of deposits on the approached tube support plate 700, 800.

Figure 2A:
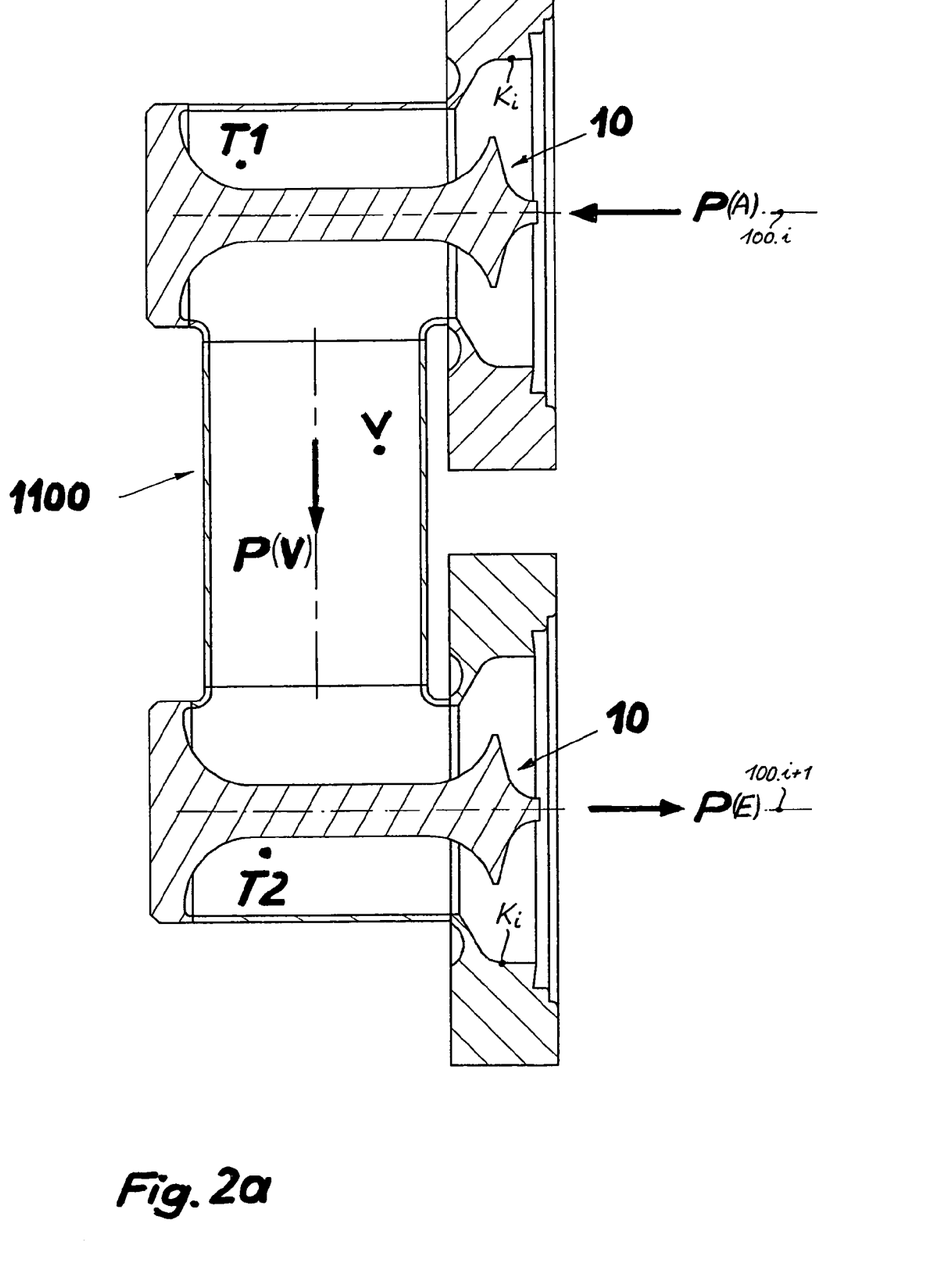
FIG. 2a shows a central section through the connection fitting according to FIG. 2, with a further displacement body arranged in a first swirl chamber, wherein the latter is arranged at the downstream side of a not shown tube support plate.

According to FIG. 2a, the connection fitting 1100 depicted and described in FIG. 2 is in addition equipped with a further displacement body 10 on the downstream side of the tube bundle 100.i also, and thus in the first swirl chamber tube support plate 700, 800, by which turbulences and swirls and consequently a transverse flow across the tube support plate 700, 800 is generated. In connection with a flow velocity which is locally increased at the tube support plate 700, 800, an improved cleaning effect is achieved in the through-flow cleaning (CIP cleaning) by this.

Figure 3:
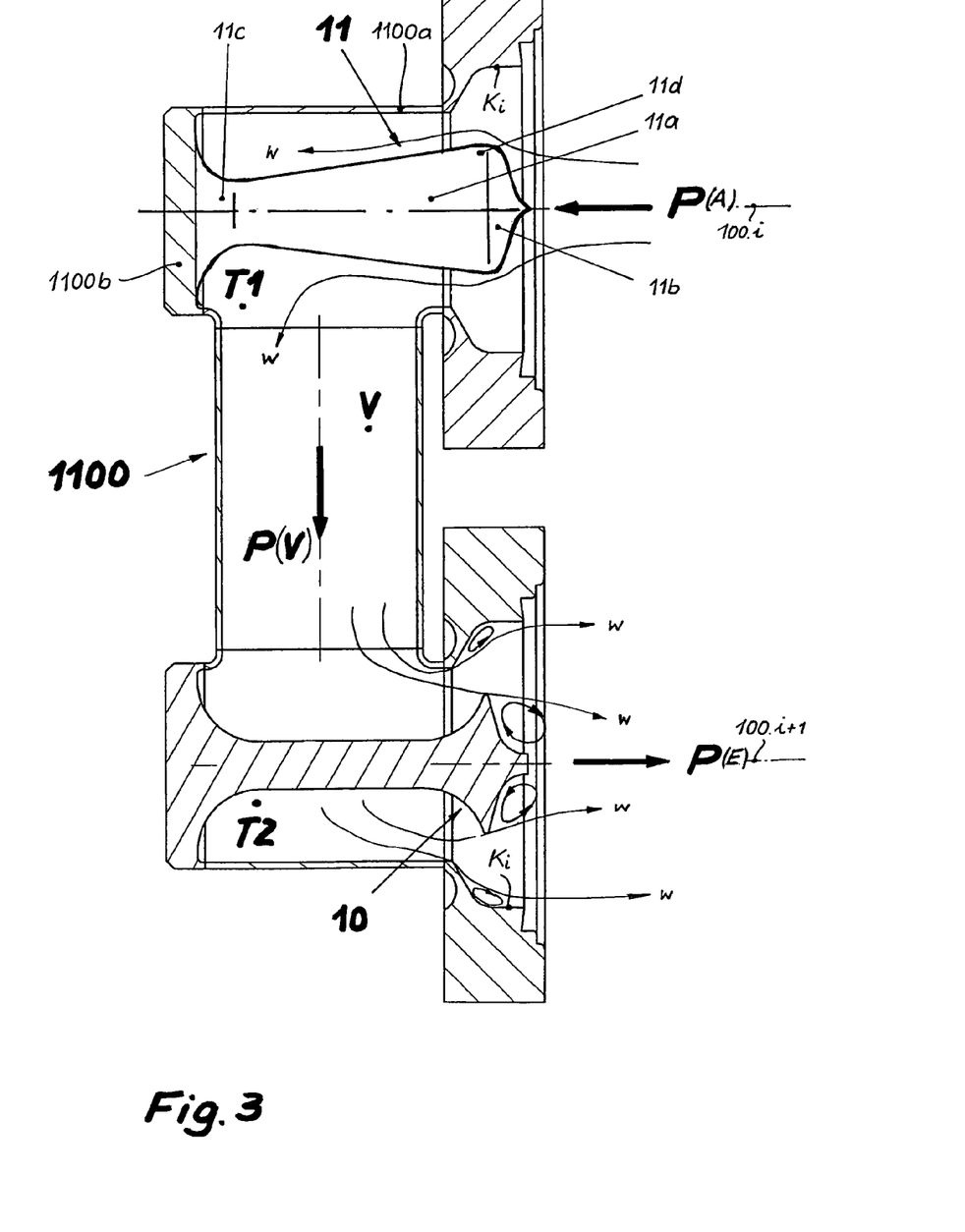
FIG. 3 shows a central section through the connection fitting according to FIG. 2, with a further displacement body, modified with respect to FIG. 2a and arranged in the first swirl chamber.

FIG. 3 shows a second embodiment of a second displacement body 11 arranged at the downstream side of the tube bundle 100.i. This second displacement body 11 is fixed on the chamber bottom 1100b in the first swirl chamber T1 via a second shank part 11c. At the connection cross section between a second shank side portion 11a which tapers when seen in the flow direction and a portion 11b distal to the shank, the second displacement body 11 renounces to have a circumferential flow separation edge. Instead, it has a convex rounding 11d in the region of the connection cross section. The purpose of this form is the same as in the arrangement according to FIG. 2a. Admittedly, with the second displacement body 11 the requirement is taken into account that a cross flow in the region between the tube support plate 700, 800 and the displacement body 11 is advantageous, but that when seen in the flow direction, a separation and swirling into the first swirl chamber T1 is not necessary. In co-operation with the shell surface of the chamber casing 1100a, the form of the shank side portion 11a tapering in the flow direction generates quasi a diffusor, which causes a gradual retardation of the flow with the flow velocity w and thus counteracts a separation of the flow.

Figure 4:
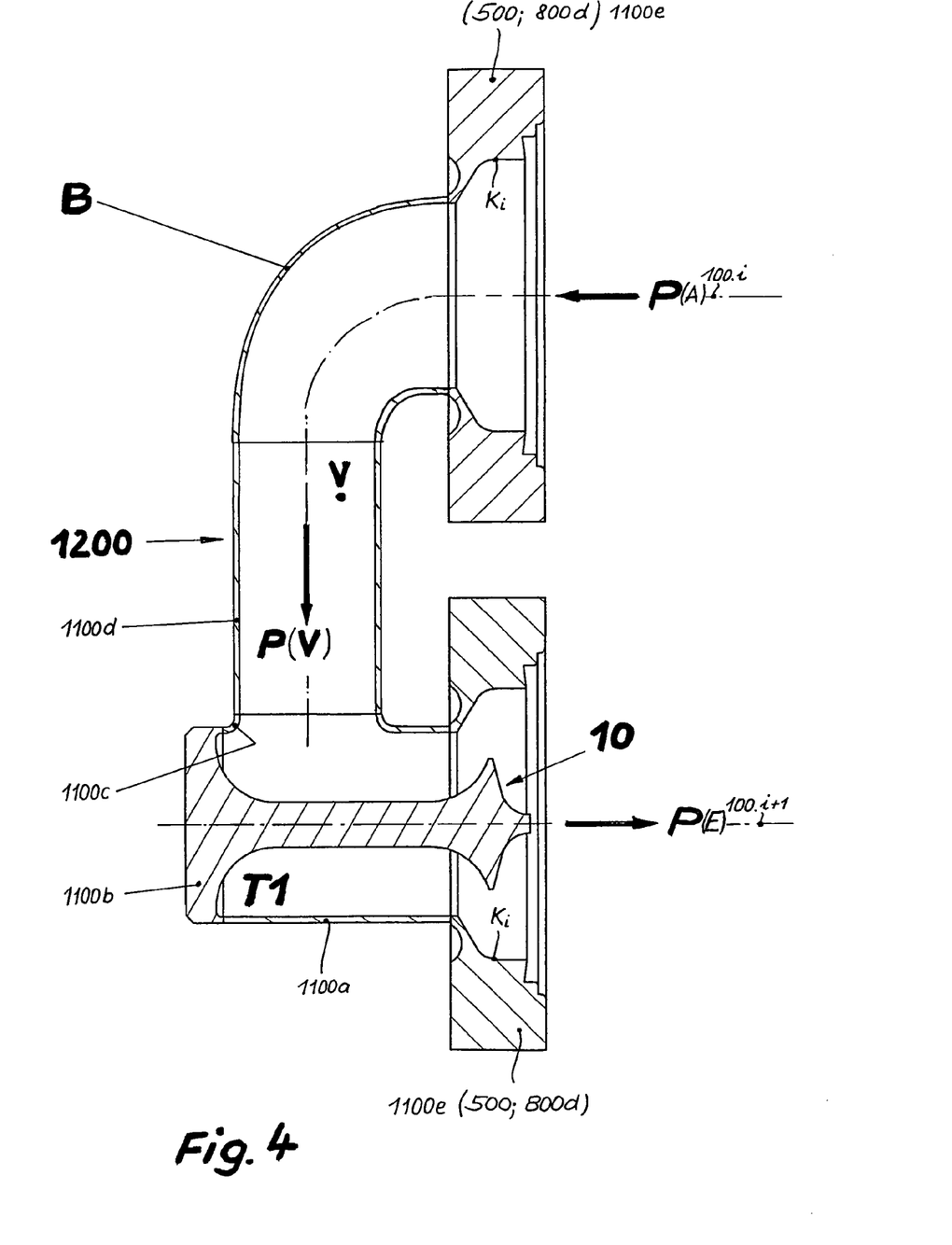
FIG. 4 shows a central section through the proposed connection fitting in a second embodiment, wherein a displacement body is arranged at the approach side of a not shown tube support plate inside the first swirl chamber and the latter is connected to an exchanger flange or a connection bend via a linear connection channel and subsequently via a 90 degree deflection bend.

When the flow influencing measures are limited to the approach side of the tube support plate 700, 800, a second connection fitting 1200 (FIG. 4) is proposed. The same is designed such that a first swirl chamber T1 is assigned to the approached tube support plate 700, 800 of the tube bundle 100.i+1, which is connected in a flow permitting way to the chamber flange 1100e (exchanger flange 500 or connecting piece 800), flange-mounted on the tube bundle 100.i, via the initially essentially linear and vertical to the longitudinal direction of the tube bundles 100.i, 100.i+1 extending connection channel V and subsequently via a 90 degree deflection bend B.

Figure 5A:
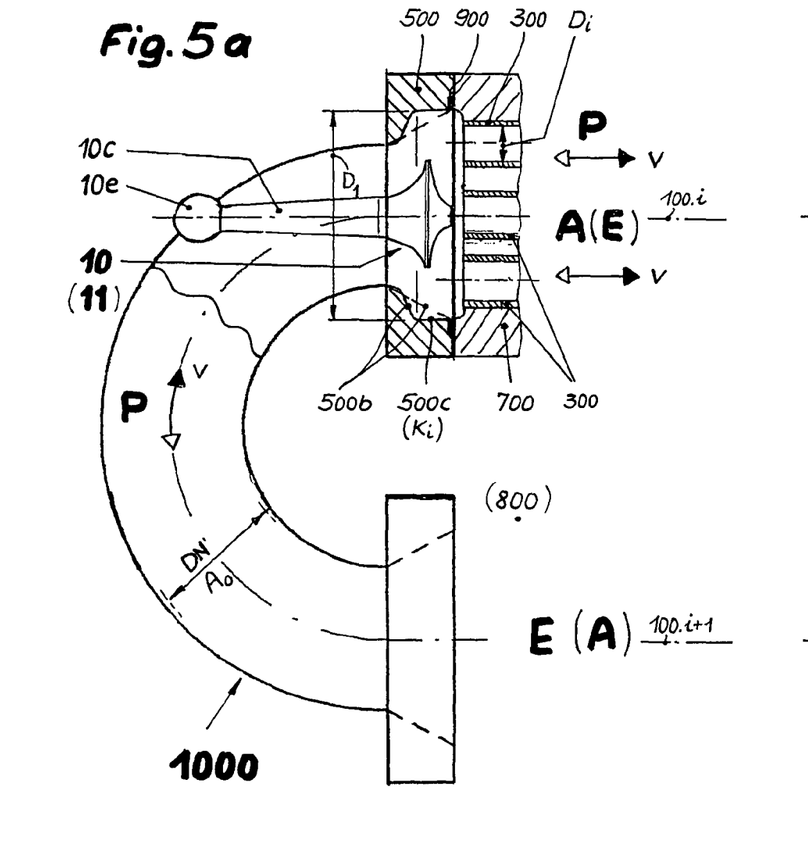
FIG. 5a shows partially in a section and partially in the top view an 180 degree connection bend of the state of the art for tube bundle heat exchangers, wherein this connection bend in the region of a tube support plate has been equipped with a displacement body in the course of a back fitting.
Figure 5B:
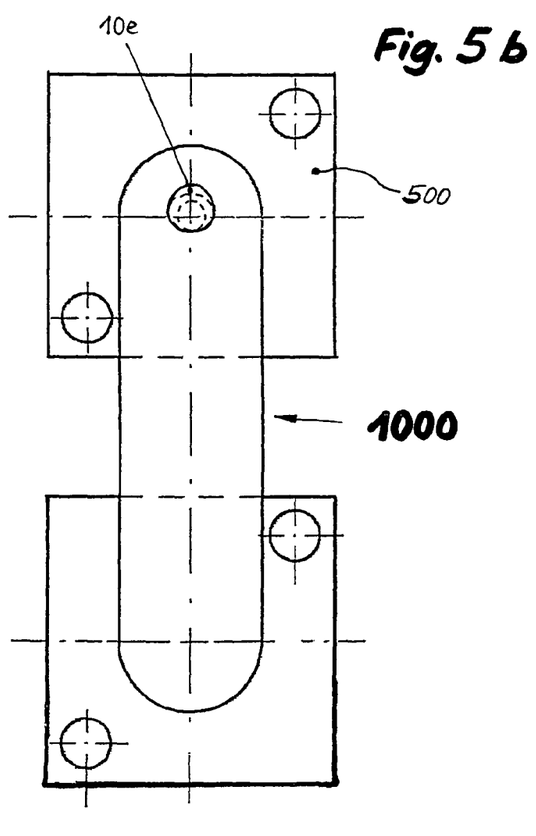

FIGS. 5a and 5b show the connection bend 1000 as it has been hitherto the state of the art (FIG. 1), which connects the inner tubes 300 through which product flows of two neighbouring, essentially parallel arranged, series connected tube bundles 100.i, 100.i+1, with each other in the region of the respective tube support plate 700, 800.

The present invention permits in the most simple manner which is conceivable the back fitting of these connection bends 1000 with the displacement body(s) 10, 11 in consideration, wherein in the example of realisation, the tube support plate 700, 800 is used at the approach side of the tube support plate 700. The shank part 10c of the displacement body 10 ends in a fastening portion 10e, which penetrates the connection bend 1000 and is fixedly connected with the same in the penetration region, preferably positively closed by material, normally by welding.

When the ends of neighbouring tube bundles 100.i, 100.i+1 are connected to each other by means of the proposed connection fitting 1100, 1200, their manufacture in connection with the displacement body 10, 11 is significantly simplified according to a further proposal, when the latter and the respective associated chamber bottom 1100b are formed in one single, rotationally symmetric piece. This single piece is preferably made by chip removal (as a turned component for instance).

LIST OF THE REFERENCE SIGNS OF THE ABBREVIATIONS USED

FIG. 1 (State of the Art)
100 tube bundle heat exchanger
100.1, 100.2, . . . 100.i, . . . 100.n tube bundle
100.i i-th tube bundle
100.i+1 tube bundle connected behind the tube bundle 100.i
100.i−1 tube bundle connected before the tube bundle 100.i
200 outer shell
200* outer channel
200a outer shell flange at the fixed bearing side
200b outer shell flange at the movable bearing side
300 inner tube
300* inner channel
400.1 first casing
400a first connection piece
400a* first crosswise channel
400.2 second casing
400b second connection piece
400b* second crosswise channel
500 exchanger flange at the fixed bearing side
500a first connection opening
500b first conical throat
500c first enlarged passage cross section
600 exchanger flange at the movable bearing side
700 tube support plate at the fixed bearing side (tube mirror plate)
800 tube support plate at the movable bearing side (tube area plate)
800a second connection opening
800b second conical throat
800c second enlarged passage cross section
800d connection piece at the movable bearing side
900 flat sealing
910 O-ring
1000 connection bend
c flow velocity in the outer shell
v average flow velocity in the inner tube
A outlet (downstream side of the tube support plate 700, 800
$A_i$ passage cross section of the inner tube
$nA_i$ overall passage cross section of all parallel flown through inner tubes
$A_o$ rated passage cross section of the connection bend
$D_i$ tube inner diameter (inner tube 300)
$D_j$ greatest diameter of the first enlarged passage cross section 500c in the exchanger flange at the fixed bearing side
DN rated diameter of the connection bend ($A_o = DN^2 \pi/4$)
E entrance (approach side of the tube support plate 700, 800)
$K_i$ inner contour
M heat carrier medium, generally
P product (heat treated side)
FIGS. 2 to 5b
10 displacement body
10a portion proximal to the shank
10b portion distal to the shank
10c shank portion
10d flow separation edge
10e fastening piece
10f end side periphery
10g second flow separation edge
10h first concave outer contour
10i second concave outer contour
11 second displacement body
11a second portion proximal to the shank
11b second distal portion distal to the shank
11c second shank part
11d rounding
1100 connection fitting
1100a chamber casing (first circular tube, for instance)
1100b chamber bottom
1100c chamber connection piece (collar for instance)
1100d connection casing (second circular tube, for instance)
1100e chamber flange
1200 second connection fitting
a distance of the connection channel
b average distance of the tube support plates (tube bundles)
d length of the connection casing
$d_{max}$ outer diameter of the displacement body
$d_3$ shank diameter
w flow velocity in the connection fitting
$A_S$ ring gap cross section
$A_{SE}$ enlarging ring gap cross section
$A_{Smin}$ Minimal ring gap cross section (narrowest site of the ring gap cross section $A_S$)
B deflection bend
P(A) leaving flow of product
P(E) entering flow of product
P(V) cross-flowing flow of product (cross flow)
S axis of symmetry
T1 first swirl chamber
T2 second swirl chamber
V connection channel The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A device for influencing a flow in the region of a tube support plate (700, 800) of a tube bundle heat exchanger (100), the device comprising:
an outer channel (200*) surrounded by an outer shell (200);
a heat carrier medium (M) flowing through the outer channel (200*);
an inner channel (300*);
the inner channel (300*) extending through the outer channel (200*), the inner channel (300*) defining an axis that is parallel to an axis defined by the outer shell (200);
the inner channel (300*) being formed by a plurality of inner tubes 300, which run parallel to each other;
the inner tubes (300) being supported at one end in a fixed bearing side tube support plate (700), and at the opposite end in a floating bearing side tube support plate (800)
the fixed bearing side tube support plate (700) and the floating bearing side tube support plate (800) being supported directly or indirectly in the outer shell (200);
a product (P) flowing through the inner tubes (300);
either an exchanger flange (500) or a chamber flange (1100e) being connected to the fixed bearing side tube support plate (700);
one of a common inlet (E) or outlet (A), at one end of all inner tubes (300), being defined by the exchanger flange (500);
the other of a common inlet (E) or outlet (A) at the opposite end of all inner tubes (300) collectively defined by the chamber flange (1100e) and a connecting piece (800d) that is connected to the floating bearing side tube support plate (800);
at least two tube bundle heat exchangers (100) being connected in series, arranged in parallel to each other, which are connected together in a fluid passable manner with respect to the product (P), via a connection bend (1000) or a connection fitting (1100; 1200);
a displacement body (10; 11) arranged axially symmetric and concentric to the tube support plate (700, 800) to influence the flow of the product (P) in the region of the tube support plate (700;800);
the displacement body (10; 11) comprising a shank part (10c; 11c), the shank part (10c; 11c) extending in the direction of an axis of symmetry (S) of the displacement body (10; 11);
the shank part (10c; 11c), at the end thereof, being fixedly connected to the connection bend (1000) or the connection fitting (1100; 1200) in a manner such that the displacement body (10; 11) is fixed in a stationary relationship relative to the tube support plate (700; 800);
the connection bend (1000) or the connection fitting (1100; 1200) being connected to the exchanger flange (500) and the connecting piece (800d);
the displacement body (10; 11) being formed from two portions (10a; 10b; 11a; 11b) that at connecting cross sections thereof form a greatest common exterior diameter ($d_{max}$);
the displacement body (10; 11), axially symmetrically dividing the flow into or out of the inner channel (300*), deflecting the flow towards the outside and in doing so accelerating the flow in a nozzle-like constricted annular gap cross section ($A_s$) between the displacement body (10; 11) and a first portion of an inner contour ($K_i$) of the exchanger flange (500; 1100e) or the connecting piece (800d);
the annular gap cross section ($A_s$) at a second portion of the inner contour ($K_i$) defining an enlarging annular gap cross section ($A_{SE}$).

2. A device according to claim 1, characterised in that the displacement body (10) is arranged at the approach side of the tube support plates (700, 800).

3. A device according to claim 1, characterised in that the displacement body (10) or a second displacement body (11) is arranged at the downstream side of the tube support plates (700, 800).

4. A device according to claim 1, characterised in that the displacement body (10) is arranged at the approach side and the displacement body (10) or a second displacement body (11) is arranged at the downstream side of the tube support plate (700, 800).

5. A device according to claim 4, characterised in that the displacement bodies (10; 10, 11) are arranged in the connection bend (1000) or in the connection fitting (1100).

6. A device according to claim 1, characterised in that the inner contour (Ki) is formed by a first or a second, respectively, enlarged passage cross section (500c, 800c) within the exchanger flange (500) or the connecting piece (800d), respectively.

7. A device according to claim 1, characterised in that the displacement body (10) has a circumferential flow separation edge (10d).

8. A device according to claim 7, characterised in that the flow separation edge (10d) is positioned in the enlarged passage cross section (500c, 800c).

9. A device according to claim 7, characterised in that the flow separation edge (10d) is positioned at a narrowest site, namely the minimal ring gap cross section $A_{Smin}$ of the ring gap cross section ($A_S$).

10. A device according to claim 7, characterised in that when seen in the flow direction, the flow separation edge (10d) is positioned behind a narrowest site of the ring gap cross section ($A_S$).

11. A device according to claim 1, characterised in that the outside diameter ($d_{max}$) of the displacement body (10) is dimensioned such that a cross section of the passage of each inner tubes (300), which are situated on the outer edge of the tube support plates (700, 800), and which is formed by a respective tube inside diameter ($D_i$), is covered each about half by a plane of flow, projected in the direction of the tube support plates (700, 800), of the displacement body (10).

12. A device according to claim 1, characterised in that the two portions (10a, 10b) are realized to be axially symmetric and that together, they form the flow separation edge (10d) at the connection cross section.

13. A device according to claim 1, characterised in that the portions (10a, 10b) each have a concave outer contour (10h, 10i).

14. A device according to claim 1, characterised in that the shank part (10c) passes into a neighbouring portion (10a) in a continuous way.

15. A device according to claim 1, characterised in that a periphery (10f) at the end side of the portion (10b) distal to the shank forms a second circumferential flow separation edge (10g).

16. A device according to claim 1, with the connection fitting (1100), which connects the inner tubes (300) of two neighbouring, substantially parallel arranged and series-connected tube bundles (100.i, 100.i+1) with each other in the region of the respective tube support plates (700, 800), characterised in that a first or second swirl chamber (T1; T2) is connected with a tube support plate (700, 800) and that the first and the second swirl chamber (T1; T2) are connected with each other by an essentially linearly extending connection channel (V) in a fashion which allows flow to pass through, which is oriented perpendicular to the longitudinal direction of the tube bundles (100.*i*, 100.*i*+1).

17. A device according to claim 16, characterised in that the first or second swirl chamber (T1; T2) are each one realized to be pot-shaped, with a shell-shaped chamber casing (1100*a*) an a substantially planar chamber bottom (1100*b*), that at the open end distal to the chamber bottom (1100*b*) is arranged a chamber flange (1100*e*), sealable towards the tube support plates (700), that a chamber connecting piece (1100*c*) is provided in the shell-shaped chamber casing (1100*a*), and that the respective chamber connecting piece (1100*c*) is connected to a connection casing (1100*d*).

18. A device according to claim 17, characterised in that the respective chamber connecting piece (1100*c*) is realized as to be relatively short.

19. A device according to claim 17, characterised in that the chamber connecting piece is executed to be rounded, at least at an inner side.

20. A device according to claim 17, characterised in that for the chamber casing (1100*a*) and the connection casing (1100*d*), respectively, a circular tube is used and that the chamber connecting piece (1100*c*) is realized as a collar.

21. A device according to claim 1, with the connection fitting (1200), which connects the inner tubes (300) of two neighbouring, substantially parallel arranged and series-connected tube bundles (100.*i*, 100.*i*+1) with each other at tube support plates (700, 800), characterised in that a first swirl chamber (T1) is connected with the approached tube support plate (700, 800) via a chamber flange (1100*e*), wherein the first swirl chamber is connected to the exchanger flange (500) or the connecting piece (800*d*) via a connection channel (V), first extending essentially linear and perpendicular to the longitudinal direction of the tube bundles (100.*i*, 100.*i*+1) and subsequently via a 90 degree deflection bend (B), in a fashion which allows flow to pass through.

22. A device according to claim 21, characterised in that the first swirl chamber (T1) is realized as to be pot-shaped, with a shell-shaped chamber casing (1100*a*) an a substantially planar chamber bottom (1100*b*), that at the open end distal to the chamber bottom (1100*b*) is arranged a chamber flange (1100*e*), sealable towards the tube support plates (700), that a chamber connecting piece (1100*c*) is provided in the shell-shaped chamber casing (1100*a*), and that the chamber connecting piece (1100*c*) is connected to a connection casing (1100*d*).

23. A device according to claim 22, characterised in that the chamber connecting piece (1100*c*) is realized to be relatively short.

24. A device according to claim 22, characterised in that the chamber connecting piece (1100*c*) is realized to be rounded, at least at the inner side.

25. A device according to claim 22, characterised in that for the chamber casing (1100*a*) and the connection casing (1100*d*), respectively, a circular tube is used and that the chamber connecting piece (1100*c*) is realized as a collar.

26. A device according to claim 17, characterised in that the displacement body (10; 11) and the respective associated chamber bottom (1100*b*) are made in one single, rotationally symmetric piece.

* * * * *